Aug. 3, 1937.   M. PORTL   2,088,666

FAUCET

Filed Jan. 27, 1936

INVENTOR.
MICHAEL PORTL.
BY William E. Hall
ATTORNEY

Patented Aug. 3, 1937

2,088,666

UNITED STATES PATENT OFFICE 2,088,666

FAUCET

Michael Portl, Los Angeles, Calif.

Application January 27, 1936, Serial No. 60,998

2 Claims. (Cl. 251—160)

My invention relates to faucets, and particularly to a valve portion of faucets.

One of the objects of this invention is to provide a valve or faucet of simple and economical construction, and one which will not readily deteriorate or get out of order.

Another object of this invention is to provide a valve or faucet which will seat or shut off readily whether new or old, which will easily and tightly shut off the fluid flowing through the faucet, and one which will not stick when closed and which may therefore be easily opened.

A further object of this invention is to provide a valve or faucet in which the sealing valve member may revolve readily as it is forced against its seat so as to insure a seal not withstanding unevenness in the valve seat or the valve member, and so as automatically to correct unevenness of wear on the valve member as the valve stem is rotated.

A still further object of this invention is to provide a cork backing between the valve member and the valve member actuating means, a backing which will not deteriorate readily by the fluid flowing thru the faucet, which will permit and facilitate free rotation of the valve member relative to the actuating means, and which expands slightly when subjected to moisture thus supplementing the flexibility of ready seating of the valve member against the seat.

With these and other objects in view as will appear hereinafter, I have devised a novel valve or faucet having certain novel features of construction, combination, and arrangement of parts as will be hereinafter described in detail and particularly set forth in the appended claims, reference being had to the accompanying drawing and to the characters of reference thereon, which form a part of this application, in which:

Figure 1:
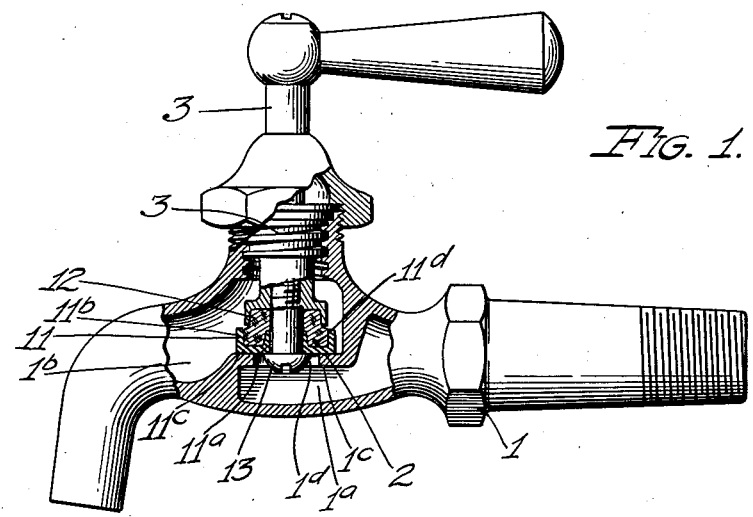
Fig. 1 is a side elevation of a conventional water faucet incorporating my invention in one form, portions being broken away and in section to facilitate the illustration.

In the conventional faucet, the casing 1 is provided with an intake passage $1^a$ and discharge passage $1^b$ separated by a wall $1^c$ having an opening $1^d$ surrounded by a valve seat 2 against which the valve member is forced by a stem 3 which is usually screwably mounted in the casing. In the embodiment of my invention, as shown in the drawing, I have provided a cup shaped valve member 11, substantially in the form of a disc, but having a long hub $11^a$ and a wide peripheral wall $11^b$ connected at the bottom by a disc portion $11^c$ which forms the seating portion of the valve and seats against the wide annular seat 2. The inner side of the valve member has an annular channel $11^d$ for the reception of a correspondingly shaped cork washer 12 of considerable thickness. The valve member is rotatably secured to the seat end of the valve stem by a stud screw 13 with the cork washer compressed between the valve member and the valve stem. I have found that cork does not deteriorate readily in most fluids, may be readily compressed, does not readily lose its resiliency when compressed and when subjected to moisture, and does not, when compressed, produce frictional resistance to the rotation of the valve member. It is also noted that the cork washer expands slightly when subjected to moisture, causing a slight swelling and insuring a tighter seal against the seat 2.

The valve member is preferably made from "Phenolite" or other fibre and readily forms a tight seat against the metal valve seat.

In the conventional faucet, the seat consists of an annular ridge surrounding the hole $1^d$. This ridge is removed when replacing the conventional valve with my construction, as described.

Figures 2, 3:
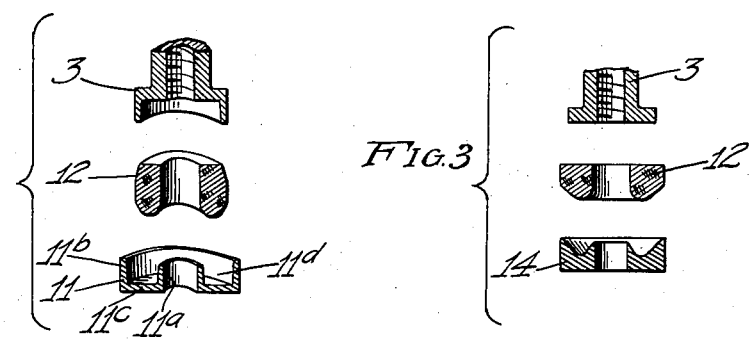
Fig. 2 is an exploded perspective view of the essential elements of my new valve construction in one form and shown fragmentary and in section; and, Fig. 3 is an exploded view in sectional elevation of the valve member and washer in a slightly modified form.

In the modified structure, which applies preferably to valves of smaller diameter, the annular groove 14 is shallower and the cork washer thinner, as shown in Fig. 3.

Though I have shown and described a particular construction, combination and arrangement of parts and portions, and a certain modification thereof, I do not wish to be limited to the same, but desire to include in the scope of my invention the construction, combination and arrangement substantially as set forth in the appended claims.

I claim:

1. In a faucet, a casing having a valve seat, a valve stem mounted in the casing with one end adjacent the seat, a cup-shaped valve member rotatably mounted on the seat end of the stem with the cup portion toward the stem and the opposite flat portion toward the valve seat, the axial portion of the valve member having a long hub forming its rotating bearing, and a cork washer positioned within the cup portion of the valve member and against said seat end of the stem.

2. In a faucet, a casing having a flat circular valve seat, a valve stem rotatably mounted in the casing coaxial with the seat, a cup-shaped valve disc having an axial hub and a cylindrical peripheral wall coaxial with the hub and spaced radially outwardly, said wall and said hub being connected by a flat disc portion at one side of the hub and wall, forming an annular depression at the opposite side, a stud extending through the hub and rotatably securing the disc to the seat end of the stem with the depression toward the stem and the disc portion against the seat, and a cork washer positioned in the depression yieldingly separating the disc from the end of the stem.

MICHAEL PORTL.